United States Patent [19]

Frank et al.

[11] 3,981,566

[45] Sept. 21, 1976

[54] LEVER-ACTION MOUNTINGS FOR BEAM STEERER MIRRORS

[75] Inventors: Lee F. Frank; James K. Lee, both of Rochester, N.Y.

[73] Assignee: Eastman Kodak Company, Rochester, N.Y.

[22] Filed: Sept. 23, 1974

[21] Appl. No.: 508,775

[52] U.S. Cl. .................................. 350/285; 350/6
[51] Int. Cl.² ............................................. G02F 1/29
[58] Field of Search ................... 350/6, 7, 285, 289; 248/476, 479, 486

[56] References Cited
UNITED STATES PATENTS

| | | | |
|---|---|---|---|
| 1,438,974 | 12/1922 | Wente | 350/6 |
| 1,789,521 | 1/1931 | Feingold | 350/6 X |
| 2,920,529 | 1/1960 | Blythe | 350/285 |
| 3,108,161 | 10/1963 | Tourtellot | 350/6 |
| 3,156,759 | 11/1964 | Collen | 350/6 |
| 3,479,107 | 11/1969 | Blythe et al. | 350/6 |
| 3,758,199 | 9/1973 | Thaxter | 350/285 |
| 3,794,410 | 2/1974 | Elliott | 350/285 |
| 3,902,783 | 9/1975 | Bodlaj | 350/285 |

OTHER PUBLICATIONS

Fleischer, *IBM Technical Disclosure Bulletin*, vol. 13, No. 6, Nov. 1970, pp. 1648 and 1649.
Fowler et al., *Applied Optics*, vol. 5, No. 10, Oct. 1966, pp. 1675–1682.
Shaffer et al., *Applied Optics*, vol. 9, No. 4, Apr. 1970, pp. 933–937.
Grenda et al., *Electro–Optical Design*, Apr. 1974, pp. 32–34.

*Primary Examiner*—John K. Corbin
*Assistant Examiner*—F. L. Evans
*Attorney, Agent, or Firm*—G. E. Grosser

[57] ABSTRACT

A mirror-type light beam deflector or steerer utilizes a hinged mounting linkage to couple a beam deflecting mirror to a mirror driving apparatus. In a preferred form, flexible hinges are employed to avoid any introduction of play or looseness between the mirror and mirror driver.

11 Claims, 10 Drawing Figures

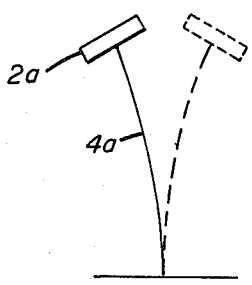
FIG. 1A PRIOR ART
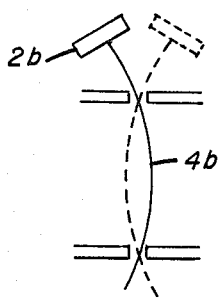
FIG. 1B PRIOR ART
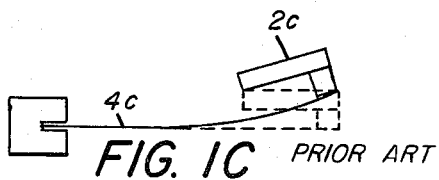
FIG. 1C PRIOR ART
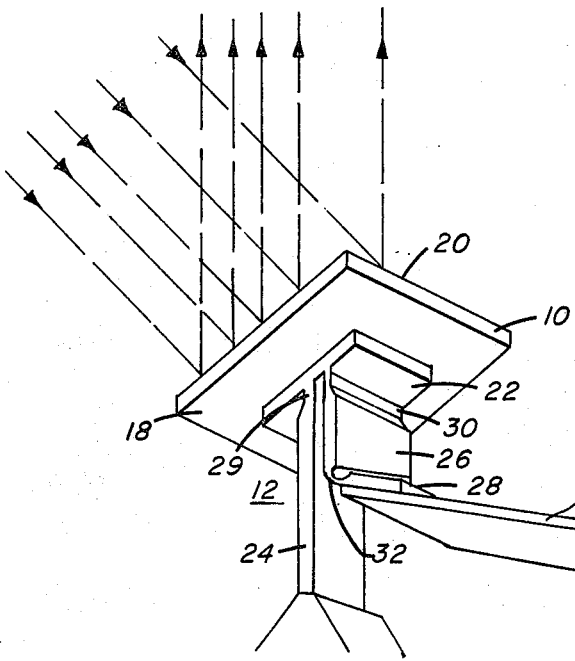
FIG. 2
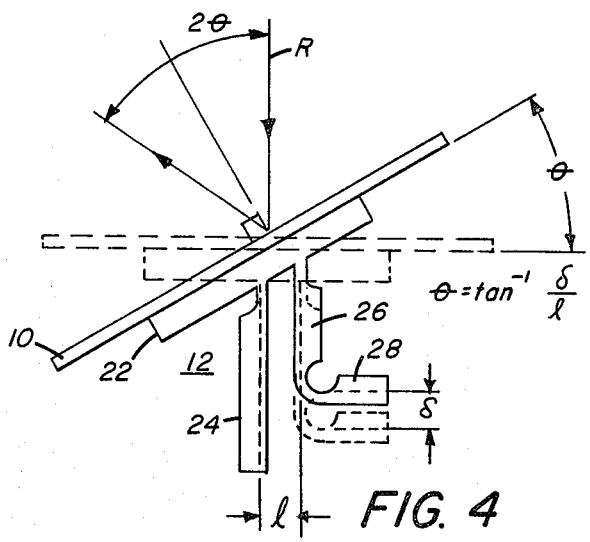
$\theta = \tan^{-1} \dfrac{\delta}{l}$
FIG. 4
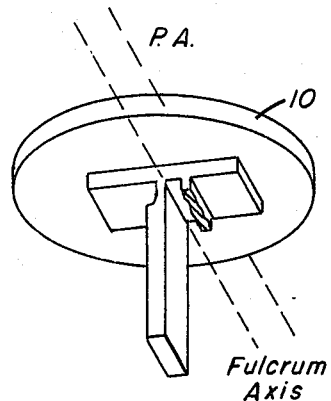
FIG. 5A
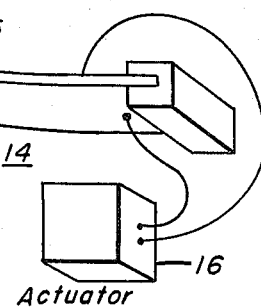
Actuator

LEVER-ACTION MOUNTINGS FOR BEAM STEERER MIRRORS

BACKGROUND OF THE INVENTION

1. Field of the Invention

The present invention relates to optical beam steerers of the type employed in optical scanning and tracking systems, and more particularly to such beam steerers which utilize a mechanically-positioned beam deflecting mirror.

2. Description of the Prior Art

Before discussing the prior art, it is noted that reference is made below to FIGS. 1A through 1C which illustrate certain prior art beam steering arrangements:

An essential element in a variety of information processing systems of the type which include optical scanning and/or tracking apparatus is a controllably positionable light beam deflecting mirror. In high speed scanning or tracking systems, for example those used in optical computer output devices, the beam deflecting mirror must be capable of rapidly and accurately directing an incident light beam to a desired location.

In comparing and evaluating the performance of beam steerers, various characterizing parameters are useful. One such parameter is system bandwidth, which serves to indicate how rapidly the beam steerer is capable of responding to a control signal. In this regard, it is noted that the dynamic properties of mirror-type beam steerers tend to limit operation to scanning frequencies in the acoustical range and generally to scanning frequencies below several kilohertz. This limitation is the result of the attenuation which occurs when the mirror system is operated above the lowest mechanical resonance frequency for the system. This resonance frequency is determined by certain physical characteristics of the system, such as the moment of inertia of the mirror and the stiffness of the system driving the mirror. Generally, an acceptable bandwidth for scanning or tracking purposes is achieveable by appropriate selection of steering system components and, accordingly, bandwidth limitations have not proven a serious deterrent to the use of mirror-type beam steerers in optical information processing apparatus.

A further important characterizing parameter is the number of resolvable positions (which in the art are called "spots") which a beam may be caused to assume. (This number is often referred to as resolution or resolving power of the system.) System resolution provides an indication of the amount of information which can be scanned with each sweep of the steerer. Mirror size and the maximum range of angular deflection for the mirror both influence resolution. It should be noted, however, that, while the number of spots is increased by increasing mirror size, the mirror's moment of inertia is attendantly increased with the result of reducing steerer bandwidth.

The maximum range of angular deflection (sweep range) is, moreover, of considerable interest in its own right as a characterizing parameter. By increasing the sweep range of a system, the length of a scan trajectory can, for example, be increased. A significant benefit of a large sweep range, it follows, is that a large area of, for example, a record medium, can be scanned with less movement of that medium in relationship to the steerer.

A further important characterizing parameter is the product obtained by multiplying resolution and bandwidth. Resolution-bandwidth product serves to indicate the rate at which information can be transferred (a higher resolution-bandwidth product indicates a potentially higher information transfer rate). This is because resolution-bandwidth product is representative of not only the number of resolvable information positions for a single scan but also how rapidly the beam can sweep over those positions.

Proceeding from the foregoing brief overview, it is helpful to consider some of the various mirror-type, beam steering systems which have been developed.

One type of steering system is electromagnetically driven and is commonly referred to as a galvanometer scanner. Systems of this type often rate high in performance (resolution-bandwidth product and sweep range), but are expensive, complex, and can present hysteresis problems (see E. P. Grenda et al. "Closing the Loop on Galvo Scanners", *Electro Optical Design*, pages 32 through 34, April, 1974).

Several others of the known types of beam steering systems utilize mirrors which are directly attached to piezo-electric shear transducers which act as drivers (see: J. J. Shaffer et al. "Bender-Bimorph Scanner Analysis", *Applied Optics*, pages 933 through 937, April, 1970; U.S. Pat. No. 3,544,201; U.S. Pat. No. 3,794,410; and U.S. Pat. No. 1,438,974). The transducer drivers are often referred to as "bimorphs" or "bimorph benders". FIGS. 1A, 1B, and 1C of the drawings illustrate the configurations of three types of steering systems using bimorph strips as drivers. In these figures, elements $2a$, $2b$, and $2c$ are mirrors, and elements $4a$, $4b$, and $4c$ are bimorphs which serve as drivers. Such systems generally provide a high resolution-bandwidth product, are simple in construction, and are low in cost. Because of these desirable characteristics, bimorph-driven steerer systems have achieved general acceptance, particularly in optical information processing equipment.

One shortcoming of bimorph-driven steerer systems, however, arises because bimorph-benders, while providing forces that are generally more than adequate, do so over very small deflection and tilt angle ranges: 0.004 inches deflection and ½° tilt angle are approximate numbers for a one-inch long bimorph-bender. Larger deflections would be desirable and, to overcome this deficiency, beam steerers aree often cascaded to provide an increased range of beam deflection angles and to improve system resolution (see V. J. Fowler et al. "A Survey of Beam Deflection Techniques", *Applied Optics*, pages 1675 through 1682, October, 1966; and U.S. Pat. No. 3,544,201). With this approach, attenuation of the beam is increased as a result of the additional reflections, and the cost and complexity of the overall apparatus increases markedly because the cascaded beam steerers must be synchronized to achieve the desired cumulative beam deflection.

A "compounding" of this complexity occurs where two-dimensional beam steering is desired. In such prior art situations, two sets of cascaded beam steerers are utilized, each of which provides a cumulative deflection of the beam in a different direction. It will be appreciated that such equipment duplication results in high equipment costs, and greatly intensifies the problems of mirror synchronization and alignment.

SUMMARY OF THE INVENTION

The invention by use of cooperating hinges in a mounting linkage couples one or more bender-type drivers to rotate a beam steerer mirror over a desired angular scan range. Hinges according to the invention are so arranged in the mounting linkage that a lever action results therein any, by selectively spacing the hinges, motion transformation is provided whereby bending motion within a driver's operative range results in mirror deflection over a desired angular range.

In its preferred form, the invention, moreover, contemplates the use of hinges of a flexible type in mounting arrangements for beam steerer mirrors to achieve freedom in motion transformation through a lever action linkage without coincidentally introducing play or looseness at the hinge joints. Play or looseness, as would exist, for example, with pin-type hinges, permits undesirable mirror wobble and position uncertainty. While flexible hinges are well known, they are generally used in a significantly different and less demanding environment than that proposed; an example being the hinges used in mounting lids to file card boxes. It is, accordingly, considered that a significant contribution of the invention resides in the discovery that flexible hinges can withstand rigorous duty in a beam steerer linkage where flexure occurrences, numbering in the billions, and flexure frequencies in the several kilohertz range may be expected.

As intimated above, a significant feature of the invention is its adaptability to provide beam steering in two dimensions without any need for multiple mirrors and multiple beam reflections. Hinges providing the freedom of movement of a ball and socket hinge are utilized for such operation. ("Hinge" is herein used in a broad sense to include more than those joints exhibiting merely angular motion in one plane.) Preferably, slender spindle-like flexible hinges (blendable in all directions) are employed. For example, according to this aspect of the invention, a first flexible spindle is used to couple a mirror to a support post and thereby define a fulcrum. Two other flexible spindles, in orthogonal alignments to the first flexible spindle, couple the mirror to respective drivers. With this arrangement, each driver is coupled to cause mirror rotation about a different (and, as described, mutually perpendicular) axis.

In accordance with the foregoing, the invention provides a mirror-type beam steering arrangement which affords flexibility for matching the force and motion characteristics of a driver to the deflection requirements imposed on the beam steering mirror, this being accomplished through the use of one or more lever action linkages.

Further, the invention provides such an arrangement which employs flexible hinges at linkage joints to avoid the introduction of play or looseness which would permit in mirror wobble.

In addition, the invention, in one form, provides a beam steering system wherein the mirror is rotated about a fulcrum hinge to reduce translation of the mirror and consequently reduce the inertial loading of the system.

Still further, the invention provides a type of mounting which enables a *single* beam steerer mirror to provide reliable beam deflection in *two* dimensions.

The invention will be discussed with reference to FIGS. 2 through 7, FIGS. 1A through 1C having been discussed above.

BRIEF DESCRIPTION OF THE DRAWINGS

FIG. 2 is an illustration in perspective of a presently preferred implementation of the invention;

FIG. 4 is a front elevational view illustrating certain geometrical relationships with regard to the invention;

FIGS. 5A and 5B are cutaway perspective views showing the fulcrum for mirror pivoting which may be provided in accordance with the invention;

Similar elements are, for purposes of clarity, given the same reference numeral. Where a sufficient difference exists, a prime suffix is used to distinguish the elements.

Referring to FIG. 2, a preferred system for implementing the invention includes a beam deflecting mirror 10, a mount 12, and a drive means 14 which preferably is comprised of a bimorph driver 15 and a controllable actuator 16 for causing deflection of the bimorph driver. The mirror 10 has a rear face 18 and a reflecting front face 20 for redirecting light rays (represented as dashed lines). At the rear face 18, the mirror 10 is attached to a receiving platform 22 which forms a part of the mount 12. The mount 12 additionally includes a support post 24, a drive link 26, and a connecting tab 28.

Figure 5B:
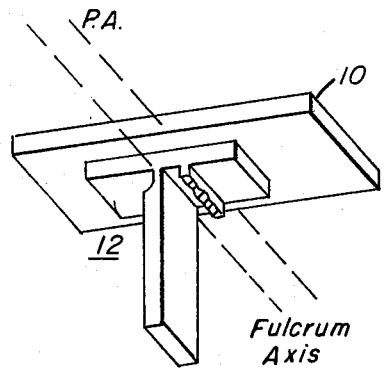

A fulcrum for rotation of the mirror 10 is provided by a hinge 29 connecting the support post 24 to platform 22.

Deflection forces causing rotation of the mirror 10 about the fulcrum of the hinge 29 are transmitted through the drive link 26 to the platform 22 by the hinge 30 having a hinge axis parallel to that of the hinge 29. Such deflections are received from the connecting tab 28 which is attached to move with driver 15 and is coupled to the drive link 26 by a hinge 32. All of the hinges 29, 30, 32 are preferably of the type which are formed of flexible material and have no gaps or mating parts to introduce play or looseness between coupled elements. Such hinges are in common use, for example on plastic card file boxes, and are, generally — though not necessarily — formed as an integral part of the box or other incorporating structure. For reliable operation, these hinges must remain flexible under the duty imposed upon them.

The recognition that flexible-type hinges can withstand the flexure frequency and number of flexure occurrences which would be expected in the operation of various beam steering systems is considered, as was mentioned above, a significant contribution of the invention. Flexible hinges for beam steerer use should be designed to operate at stress levels below the endurance limit of the forming material (for materials exhibiting such a limit). The forming material may be polyallomer, spring steel, or any of a variety of other elastic materials. Preferably, during hinge operation the forming material is stressed at levels substantially below its endurance limit, thereby minimizing the possibility of failure.

Figure 3:
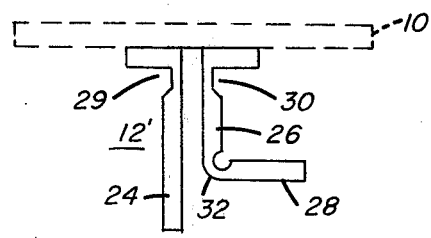
FIG. 3 is a front elevational view of an alternative implementation of the invention.

Referring to FIG. 3, there is illustrated a modified configuration for the mirror mount (denoted 12'). For the modified mount 12', the hinges 29 and 30 are attached directly to the back of the mirror 10 (shown in dashed lines).

Referring now to FIG. 4, certain geometrical relationships are illustrated which are instrumental in matching a driver such as a bimorph driver to the mirror positioning requirements imposed upon the scanning or tracking system. The distance ($l$) is the spacing between hinges 29 and 30, and the distance ($\delta$) is the deflection (motion) transmitted from the driver 14 (see FIG. 1) along the drive link 26 to the mirror 10.

The angular rotation ($\theta$) of the mirror 10 is found to be given by the relationship:

$$\theta = \tan^{-1} \delta/l \qquad \text{(Equation 1)}$$

For a particular driver, an operative range of $\delta$ can be determined. By selecting the distance $l$ to transform (Equation 1 represents the transformation relationship) a driver's $\delta$ range, through lever action, into a desired range of the deflection angle $\theta$, the steerer system is customized to that driver. The customized system provides the greatest mechanical advantage (to reduce effective loading and thereby improve bandwidth) which is consistent with achieving a desired deflection angle range. Even where the driver is inadequate to meet the desired performance requirements (e.g., the driver provides both low force and low deflections), it should be appreciated that mounting arrangements according to the invention nonetheless afford the advantage of flexibility to trade-off mirror deflection range and mechanical advantage.

It is noted at this point that, as illustrated by the ray denoted R, the incremental deflection of an incident light beam which would result from an incremental mirror rotation $\theta$ would equal $2\theta$. The doubled angle is here termed the ray deflection angle and is to be distinguished from the mirror deflection angle in comparing deflections provided by different beam steering systems. (For purposes of clarity and simplicity, the ray R is shown as being in an alignment which is normal to the mirror when $\theta = 0°$.)

A further feature of the preferred implementation of the invention is illustrated in FIGS. 5A and 5B. Versatility is afforded, according to the invention, for positioning the fulcrum axis, which is defined by the hinge 29, in close proximity to a principal axis of the mirror (FIG. 5A illustrates this for a round mirror; FIG. 5B for a rectangular mirror). Preferably, the fulcrum axis and mirror principal axis are spaced as closely together as possible to reduce translational movement of the mirror, to reduce the inertial loading of the mirror positioning system.

Figure 6:
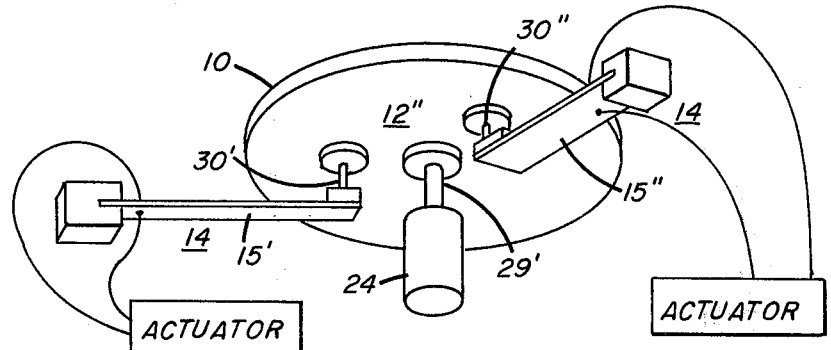
FIG. 6 is a perspective view of a preferred two-dimensional beam steerer in accordance with the invention.

Referring now to FIG. 6, a mounting linkage 12'' according to the invention is shown incorporated in a two-dimensional beam steerer: A support post 24' is connected through a spindle-like flexible hinge 29' to the mirror 10 and provides a fulcrum for mirror pivoting. (As mentioned previously, such hinges are bendable in all directions. A ball and socket hinge could also be used.) Drive means 14 includes two bimorph drivers 15' and 15''. The drivers 15' and 15'' are individually coupled to the mirror 10 through hinges 30' and 30'', respectively. The hinges 30' and 30'' are preferably arranged relative to the hinge 29' in alignments which are orthogonal. With this arrangement, the drivers 15' and 15'' may produce independent mirror rotations about respective axes which are mutually perpendicular; and individual control of beam deflection in each of two dimensions is accordingly possible through controlled actuation of the individual drivers. If the alignment axes are not made orthogonal, some interaction between drivers will occur.

Figure 7:
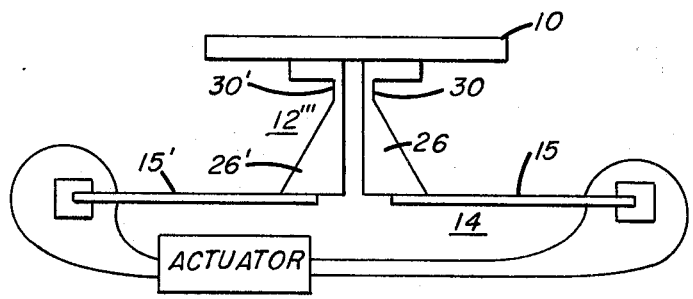
FIG. 7 is a front elevational view of a form of the invention adapted to operate in a push-pull mode.

Referring now to FIG. 7, an alternative implementation of the invention includes a mounting linkage 12''' somewhat like that of FIG. 3, but wherein a second driver coupling, for a driver 15', is provided through a drive link 26' (FIG. 7) instead of the coupling to a support post 24 (FIG. 3). As is shown, the drive links 26 and 26' are connected directly to the drivers 15 and 15', respectively. The two drivers 15 and 15' are preferably operated in a push-pull mode to cause rotational mirror deflection and, accordingly, to provide for beam steering.

The invention has been described in detail with reference to the figures; however, it should be appreciated that a number of variations and modifications, within the spirit and scope of the invention, will be suggested to those skilled in the art. For example, the flexible hinges need not be found integrally to the mounting linkage but can, instead, be formed separately and then attached to form a part of the linkage. Moreover, any of a variety of materials exhibiting a flexible characteristic may be used to form flexible hinges for use in implementing the invention. Various drive means might also be employed in practicing the invention, for example, magnetostrictive benders or solenoid drivers. And, as inferred above, the rotational axes for two-dimensional steerers need not be orthogonal.

What is claimed is: What is claimed is:

1. A mount for use in a mirror-type beam steerer to couple one or more bender-type mirror drivers, each having one fixed end and one free end, to a beam deflecting mirror, said mount comprising:
    a. a platform, having a rear face and a front face, said front face being adapted to receive such a beam deflecting mirror;
    b. a support post;
    c. a first flexible hinge connecting said support post to the rear face of said platform to define a fulcrum for rotation of said platform and the mirror received thereby;
    d. at least one drive link;
    e. individual hinges connecting said drive links to the rear face of said platform; and
    f. individual means for coupling said drive links to such mirror drivers, said coupling means each including a connecting tab adapted to be fastened to the free end of a respective driver and a hinge connecting said tab to the corresponding drive link.

2. A light beam steering apparatus for use in optical tracking and scanning systems to redirect light beams over a predetermined angular range, said steering apparatus comprising:
    a. a mirror for redirecting light beams incident thereto;
    b. a bender-type driver for producing a motion signal in accordance with an actuating signal, said driver being fixed at one end and free to move at the other;
    c. a controllable actuator means for supplying an actuating signal to said driver;

d. at least one support including a hinge coupled to said mirror for establishing a fulcrum axis for said mirror; and e. means for coupling said driver to position said mirror, said means including a drive link coupled at one end to said mirror by means of a hinge and coupled at the other end to the free end of said driver, the spacing of said hinges, being preselected to transform said driver motion signal into a mirror rotation corresponding to the predetermined angular range.

3. A positioning apparatus for a mirror, comprising:

a. a support post;

b. a first flexible hinge which couples said support post to said mirror to thereby define a fulcrum for rotation of said mirror;

c. at least one drive link;

d. a set of flexible hinges which couple said drive links to said mirror for motion transmission therebetween;

e. a set of bender-type drivers, each having one fixed end and one free end, which drivers are adatped to respond to an actuating signal to produce a corresponding motion signal, the free end of each said driver being coupled to at least one of said drive links; and f. controllable actuator means connected to each of said drivers for supplying an actuating signal thereto.

4. An apparatus according to claim 3 wherein there are a plurality of said drive links coupled to individual drivers, and wherein at least two of these drive links are in different alignments with said fulcrum, whereby mirror positioning is provided in two dimensions.

5. An apparatus according to claim 3 wherein there are two of said drive links such two drive links being arranged along alignment axes respective of said fulcrum, which axes are orthogonal to each other.

6. A light beam positioning apparatus for use in information systems, comprising:

a. a beam positioning mirror having a front reflecting face and a back face opposite said front face;

b. a rigid support post;

c. a first hinge coupling the back face of said mirror to said support post;

d. a drive link;

e. a second hinge spaced from and substantially parallel to said first hinge, which second hinge couples the back face of said mirror to said drive link; and f. a controllable bender-type driver coupled to said drive link for transmitting movement thereto.

7. An apparatus according to claim 6 wherein said first hinge has an axis which is proximate to and parallel to a principal axis for said mirror.

8. An apparatus according to claim 6 wherein said drive means is coupled to said drive link through a connecting tab which is connected to said drive link by a flexible hinge.

9. An apparatus according to claim 6 wherein a platform is attached to the back of said mirror wherein said first hinge is connected on one side to said platform and on the other side to said support post and wherein said second hinge is connected on one side to said platform and on the other side to said drive link.

10. A two-dimensional beam steering apparatus comprising:

a. a mirror;

b. a rigid post which is hinge-coupled to said mirror to define a fulcrum point therefor;

c. actuator means for producing actuating signals;

d. two drivers which respond to respective actuating signals received from said actuator means; and e. individual means coupling said drivers to said mirror at respective coupling points having different alignments with respect to said fulcrum point.

11. An apparatus according to claim 10 wherein said coupling points are orthogonally aligned.

* * * * *